(12) United States Patent  (10) Patent No.: US 8,207,831 B2
Ganz  (45) Date of Patent: Jun. 26, 2012

(54) TRANSPONDER DEMODULATOR FOR A LOW ANTENNA LIMITER THRESHOLD

(75) Inventor: Ruediger Ganz, Freising (DE)

(73) Assignee: Texas Instruments Deutschland GmbH, Freising (DE)

( * ) Notice: Subject to any disclaimer, the term of this patent is extended or adjusted under 35 U.S.C. 154(b) by 789 days.

(21) Appl. No.: 12/199,436

(22) Filed: Aug. 27, 2008

(65) Prior Publication Data

US 2010/0164725 A1   Jul. 1, 2010

Related U.S. Application Data

(60) Provisional application No. 61/016,886, filed on Dec. 27, 2007.

(30) Foreign Application Priority Data

Aug. 29, 2007   (DE) .......................... 10 2007 040 854

(51) Int. Cl.
    *G08C 19/00*   (2006.01)
(52) U.S. Cl. ...................................... 340/13.26; 329/347
(58) Field of Classification Search .................. 340/10.1, 340/10.5, 13.24–13.26, 572.1; 375/320; 329/347, 349, 350
    See application file for complete search history.

(56) References Cited

U.S. PATENT DOCUMENTS 6,031,419 A     2/2000 Roberts et al.
6,907,088 B1 *  6/2005 Nakane et al. ................ 329/347

FOREIGN PATENT DOCUMENTS

DE     19754769 A1   6/1999
EP      1087333 A    3/2001

* cited by examiner

*Primary Examiner* — Thomas Mullen
(74) *Attorney, Agent, or Firm* — William B. Kempler; Wade J. Brady, III; Frederick J. Telecky, Jr.

(57) ABSTRACT

An RFID transponder having an antenna for receiving an RF signal including an amplitude modulated downlink data signal, and a demodulating stage coupled to the antenna for receiving a derived RF signal which is derived from the received RF signal. The demodulating stage has a first filter for extracting a field strength signal component from the derived RF signal and a second filter for extracting the modulated downlink data signal component from the derived RF signal. Further, a demodulator is coupled to the second filter to receive the modulated downlink signal for demodulating the modulated downlink data signal component and coupled to the first filter to receive the field strength signal such that the demodulator is adapted to vary a demodulation sensitivity parameter in response to the field strength signal.

8 Claims, 2 Drawing Sheets

TRANSPONDER DEMODULATOR FOR A LOW ANTENNA LIMITER THRESHOLD

FIELD OF THE INVENTION

The present invention generally relates to an RFID transponder having demodulation circuitry for demodulating a received RF signal. More particularly, the present invention relates to a transponder demodulator for a low antenna limiter threshold and a corresponding method.

BACKGROUND OF THE INVENTION

RFID transponders find wide application in all kinds of control and identification tasks. An RFID transponder is used with a read/write unit (R/W), which writes data to the RFID transponder (downlink) or reads data from the transponder (uplink). RFID transponders according to the prior art can, for example, include an antenna, a limiter, a rectifier, a control unit and modulation and demodulation units. Typically these transponders are passive, i.e. they use the received RF signal as a power supply. The internal supply voltage is derived from the RF signal by means of a limiter and a rectifier. The limiter is coupled to the antenna and provides that the oscillating voltage at the antenna can not exceed a maximum peak voltage level. The limited alternating voltage is then rectified with the rectifier to receive an internal DC supply voltage. The RF signal received by the RFID transponder should also include data, i.e. the downlink data stream. The modulation used for downlink transmission is an amplitude modulation, which means that the amplitude of the RF signal is varied in accordance with the bits that are to be transmitted. The RFID transponder demodulates the amplitude modulated signal. However, in order to prevent the limiter destroying or deteriorating the information, the control mechanisms used for the limiters are made slow with respect to the variations caused by the amplitude modulation. Accordingly, the signal that has been processed by the limiter still includes the amplitude variations. Before this limited signal is rectified, the amplitude information is used for demodulation. The uplink data is transmitted by switching a load into the antenna, thereby varying the load that the transponder represents for the R/W unit. However, the present invention is concerned only with the downlink. A transponder for use in deep sub-micron processes has to operate with a much lower antenna limiter threshold than that used in former designs because of the much tighter process requirements associated with such sub-micron processes.

SUMMARY OF THE DISCLOSURE

It is a general object of the present invention to provide an RFID transponder with demodulation circuitry that can handle a reduced antenna limiter threshold and can thus be realized in deep sub-micron processes.

This and other objects and features are provided, in accordance with an aspect of the present invention provides an RFID transponder having an antenna for receiving an RF signal including an amplitude modulated downlink data signal, and a demodulating stage coupled to the antenna for receiving a derived RF signal, which is derived from the received RF signal. The demodulating stage comprises a first filter for extracting a field strength signal component from a derived RF signal and a second filter for extracting the modulated downlink data signal component from the derived RF signal. A demodulator is provided, which is coupled to the second filter to receive the modulated downlink signal for demodulating the modulated downlink data signal component and coupled to the first filter to receive this field strength signal such that the demodulator is adapted to vary a demodulation sensitivity parameter in response to the field strength signal. An RF signal is received at the transmitter in the downlink stage of the transponder. The RF signal is split into two components—a first component, the field strength signal component, which is a slow varying DC component, and a second component, which is the modulated downlink data signal component. The field strength component is extracted by the first filter and the downlink data signal component is extracted from the second filter. Before the RF signal is split into the two components by the two respective filters, it is converted into a derived RF signal by the demodulating stage. The demodulator is then adapted to receive the two split-off components of the derived RF signal. Using the field strength signal, the demodulator can then vary the demodulation sensitivity parameter in accordance with the field strength signal extracted from the derived RF signal. Thus, the field strength signal (as an indicator of received signal strength (RSSI)) is used to demodulate the modulated downlink data signal component of the derived RF signal. The present invention provides an advantage of a demodulator that can be realized in a deep sub-micron process, for example in a 13 MHz transponder, which is used in applications such as tagging and electronic passports. This demodulator is able to operate with a much lower antenna limiter threshold, under the conditions that such small deep sub-micron processes demand. It is no longer required to perform demodulation using the antenna voltage envelope, as with prior art designs.

A limiter may be coupled between the antenna and the demodulating stage. The limiter can be adapted to act fast enough to suppress amplitude variations due to the modulated downlink data signal included in the received RF signal in a limited internal supply signal. The first filter and the second filter can be coupled with an input to the limiter for receiving, as the derived RF signal, an internal control signal of the limiter, which reflects the amplitude variations that are to be prevented by the limiter. The modulated downlink data signal is a very fast-varying, high-frequency signal that carries the relevant data in the received RF signal. The limiter allows this signal to be limited in voltage to such a degree, that it can then be rectified by a rectifying circuit and used as the internal supply signal for the transponder. Thus the derived RF signal is in fact the internal control signal of the limiter, which reflects the amplitude variations. This signal can be fed directly to the demodulating stage; i.e., the first filter and the second filter. In other words, the limiter is used to stimulate the demodulating stage. Using such a fast limiter means that any modulation drops in the antenna voltage envelope usable for a demodulation are not maintained. This means that the envelope demodulation of prior art designs is no longer required.

The limiter may comprise an NMOS transistor coupled between the antenna and ground level. The gate potential of the NMOS transistor is then controlled so as to limit the output voltage of the limiter. Further, the input of the first filter and the input of the second filter can be coupled to the gate of the NMOS transistor. The input source for the demodulating stage is then the gate voltage of the NMOS transistor in the limiter.

The demodulator can comprise a comparator and the demodulation sensitivity parameter can be an input related hysteresis of the comparator. The demodulator then includes a receive signal strength indication, provided by a field strength signal input, used for a sensitivity control. This method of sensitivity control ensures field strength independence. The comparator can implement a hysteresis depending on the field strength signal output from the first filter and use this as the signal sensitivity control. The hysteresis window is enlarged if the DC offset of the derived RF signal (the field strength signal) is high and vice versa.

An aspect of the present invention also provides a method of controlling a demodulator of an RFID transponder. The method comprises receiving an RF signal, which includes an amplitude modulated downlink data signal, with an antenna of the transponder, deriving a derived RF signal from the received RF signal, which is indicative of amplitude variations of the received RF signal, splitting the received RF signal into a first signal component indicative of the field strength of the RF signal and a second signal component indicative of the amplitude modulated downlink data signal, and demodulating the second signal component with a demodulator. The demodulation sensitivity of the demodulator is controlled by use of the first signal component. The derived RF signal is first derived from the received RF signal and is then split into two components by first and second filters provided in a demodulating stage, which also includes the demodulator. The first filter extracts the signal component indicative of the field strength of the RF signal (the field strength signal, which is a slow-varying DC component) and the second filter extracts the second component indicative of the amplitude modulated downlink data signal (the part of the signal varies at a high frequency and carries the data). The first signal component is used to control the demodulation sensitivity of the demodulator, which then demodulates the second signal component.

The method may comprise using the received RF signal for supplying the RFID transponder with an internal voltage, and limiting a magnitude of the received RF signal so as to limit the internal supply voltage. The limiting step provides that the amplitude modulation of the amplitude modulated downlink data signal is suppressed in the internal supply voltage and that a signal used during the limiting step is used as the derived antenna signal. The received RF signal is limited by a voltage limiter circuit, and is then rectified to provide a DC internal supply voltage for the transponder, so that the transponder does not have to rely on an external power source. During the limiting step performed by the limiting circuitry, amplitude modulation of the amplitude modulated downlink data signal is suppressed and the limiting circuitry is coupled to the demodulating stage so that the RF signal as limited by the limiting circuitry is used as the derived RF signal from the signal received at the antenna. The limiter is adapted to be very fast so that overshoots of the antenna voltage are avoided. Amplitude modulation of the downlink data stream is controlled by the limiter in order to avoid further voltage drops of the internal supply voltage due to modulation of the amplitude modulated downlink data signal. Therefore, the method of the present invention provides the advantage that any modulation drops in the antenna voltage are not maintained.

BRIEF DESCRIPTION OF THE DRAWINGS

Further advantages and characteristics of the invention ensue from the description below of a preferred embodiment, and from the accompanying drawings, in which.

DETAILED DESCRIPTION

Figure 1:
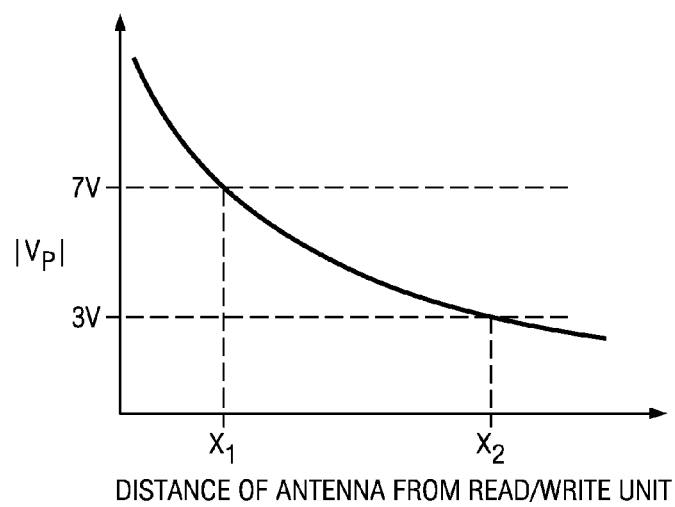
FIG. 1 is a graph of the peak voltage of an RFID transponder as a function of distance away from the read/write unit.

FIG. 1 is a graph illustrating the antenna peak voltage Vp of an RFID transponder as a function of distance away from a R/W-unit. In former designs, the magnitude of the peak voltage was 7V at a maximum distance $X_1$ away from the R/W unit, for example 10 cm, which meant an actual operating voltage (after clipping by the limiter and a voltage drop over the rectifier) of around 6V. This results in a supply voltage range of 6V down to 2.5V in which the transponder can operate. However, the corresponding values for up-to-date designs are around 3.5V and 2.8V, respectively, at a maximum distance $X_2$ away from the R/W unit, for example 30 cm. The supply voltage range here is only 2.8V down to 2.3V and thus additional voltage variations of the internal supply voltages, which are due to the amplitude modulation of the downlink signal, are not tolerable any more. Accordingly, the architectures previously used for demodulation can not be used for up-to-date RFID transponders.

Figure 2:
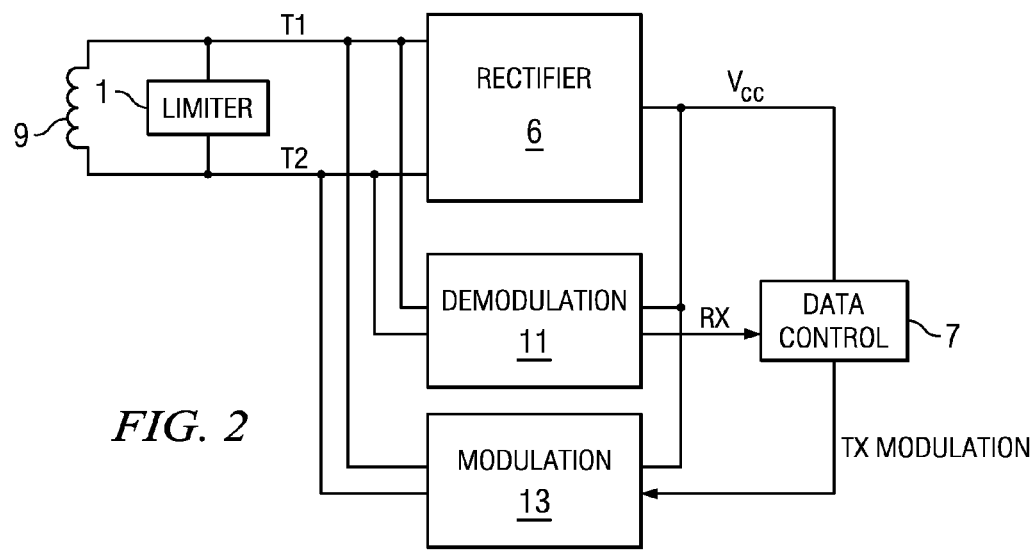
FIG. 2 is a schematic diagram of an RFID transponder.

FIG. 2 is a schematic diagram of an RFID transponder. In this figure, both the uplink and downlink stages of the transponder are shown. An antenna 9 is connected in parallel between two terminals T1 and T2, with voltage limiting circuitry 1 being connected in parallel between the two terminals T1 and T2. The terminals T1 and T2 are connected to the outputs of a modulating stage 13 and the inputs of a demodulating stage 11, and also to the inputs of a rectifier 6. The limiting circuitry 1 is operable to limit the antenna voltage, which is then rectified by the rectifier 6 to provide an internal supply voltage for the transponder at a voltage rail Vcc connected to the output of the rectifier 6. The voltage rail Vcc is connected to one input of the demodulating stage 11 and one input of the modulating stage 13, as well as to one input of a data control stage 7. The output of the demodulating stage is an output signal RX, which is fed to another input of the data control stage 7, and the output of the data control stage 7 is an output signal TX modulation, which is fed to another input of the modulating stage 13. The limiting circuitry 1, rectifier 6 and demodulating stage 11 form the downlink stage of the transponder, whereas the modulating stage 13 forms the uplink stage of the transponder. The invention, which only relates to the downlink stage, will be described in more detail below with reference to FIGS. 3 and 4.

Figure 3:
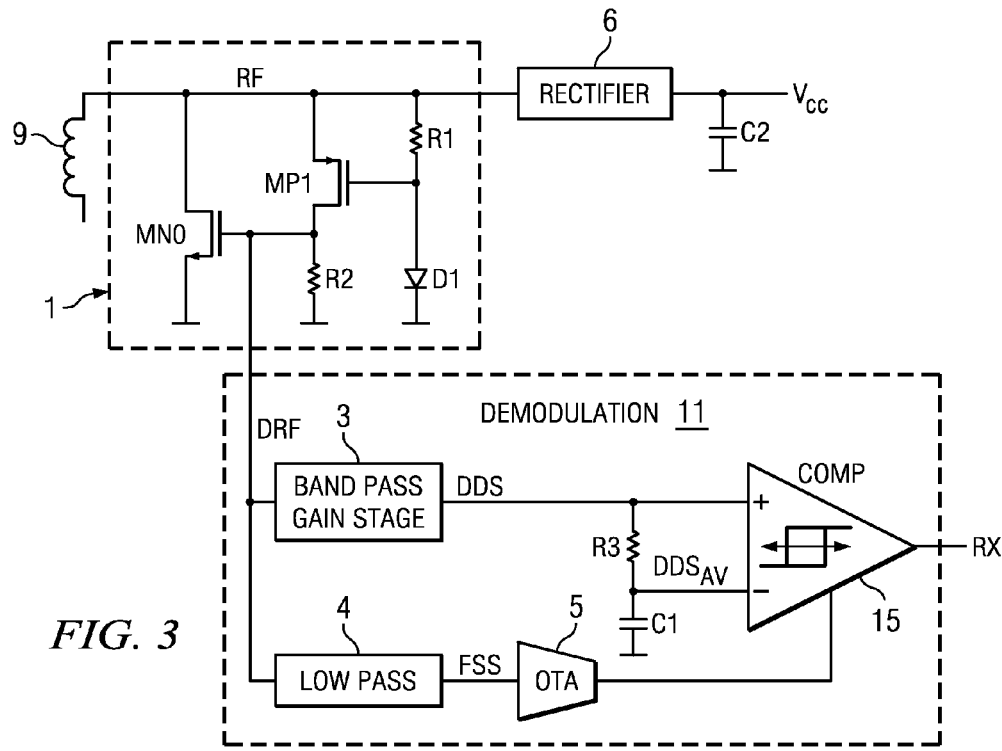
FIG. 3 is a simplified circuit diagram of the downlink stage of an RFID transponder according to the invention.
Figure 4:
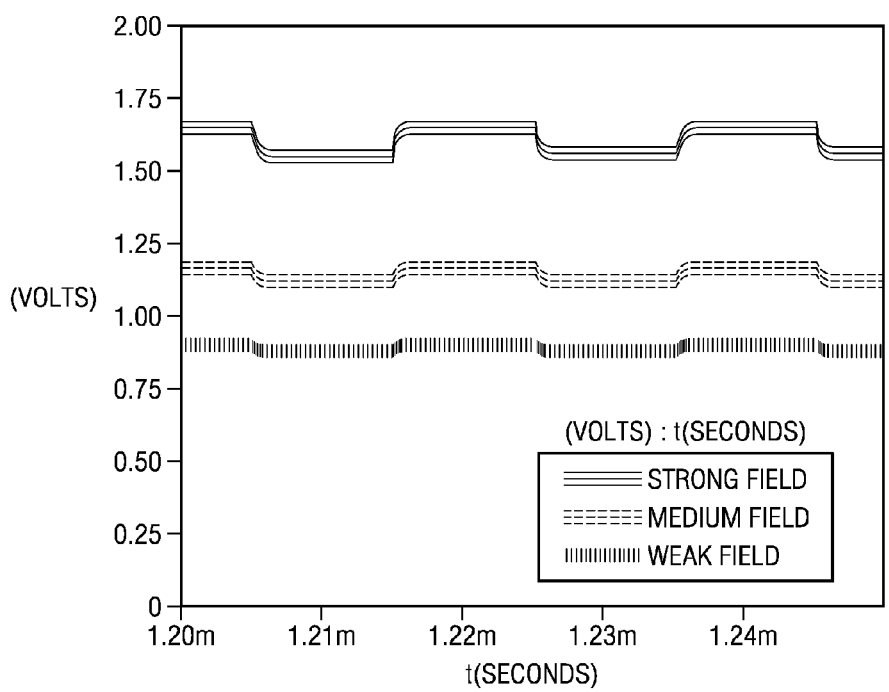
FIG. 4 is a graph of limiter gate voltage of the antenna voltage limiting circuitry at different field strengths as a function of time.

FIG. 3 shows the downlink part of an RFID transponder according to the invention having a limiter circuit 1 and a demodulating stage 11. An antenna coil 9 is operable to receive an RF signal and is coupled to a voltage rail RF. The limiter circuitry 1 has an NMOS transistor MN0, with drain and source terminals coupled to the voltage rail RF and ground, respectively. The gate terminal of the transistor MN0 is connected to the drain of a PMOS transistor MP1, which has its source connected to the voltage rail RF. The drain of the transistor MP1 is connected in series with a resistor R2. Resistor R2 is also connected to ground. A resistor R1 is connected in series with a diode D1 so that the resistor is coupled to the voltage rail RF and the diode is connected to ground such that it is forward biased in a direction from the resistor R1 to ground. A node interconnecting the resistor R1 and the diode D1 is connected to the gate terminal of the transistor MP1. A node interconnecting the gate terminal of the transistor MN0, the drain terminal of the transistor MP1, and the resistor R2 is connected to the demodulating stage 11. This node forms a voltage node DRF. The voltage node DRF is connected to a band pass gain stage filter 3 and a low pass filter 4. Low pass filter 4 is connected to the control input of a comparator 15 and the band pass gain stage 3 is connected directly to one input of the comparator 15. The other input of the comparator 15 is connected via a resistor R3 to the output of the band pass gain stage 3. A node interconnecting the resistor R3 and the input of the comparator 15 is connected to a capacitor C1, which is also connected to ground. The arrangement comprising the resistor R3 and the capacitor C1 is configured to provide an average value of the output of the band pass gain stage 3 at one input of the comparator 15, for comparison with the actual value of the band pass gain stage 3 at the other input of the comparator 15. The output of the comparator 15 is adapted to provide the demodulated downlink data signal RX.

The limiter circuitry 1 is also connected to a rectifier 6 and a buffering capacitor C2. A node interconnecting the rectifier 6 and the capacitor C2 is the supply voltage node Vcc.

When an RF signal is received at the antenna, it induces a voltage in the voltage rail RF. The limiting circuitry, including the clamping transistors MN0 and MP1 act very quickly to suppress amplitude variations due to the modulated downlink data signal included in the received RF signal. The limiter 1 switches on the transistor MN0 if the voltage increases above a predetermined limit. Since the transistor MN0 is an additional load, current flows through the transistor MN0 and the voltage at the voltage rail RF is reduced. This provides a limited voltage which is then rectified by the rectifier 6 and buffered by the capacitor C2 to provide a limited internal supply voltage at the voltage rail Vcc.

At the same time, using the gate voltage of the transistor MN0 coupled to the band pass gain stage 3 and the low pass filter 4 in the demodulating stage 11, the limiter circuit 1 provides a derived RF signal DRF derived from the received RF signal, which is in fact the gate voltage of the transistor MN0. The band pass filter 3 amplifies the modulated part of the limiter gate voltage, which is the amplitude modulated downlink data signal DDS (the high frequency signal that carries data component of the received RF signal). The field strength dependent DC offset of the received RF signal and a superimposed 13 MHz carrier signal are filtered out. The band pass filter 3 also shifts the signal to a suitable operating point. The comparator 15 then compares the output of the band pass filter 3, representing the actual gate voltage of the transistor MN0 in the limiter 1, with the average value $DDS_{AV}$ of the amplitude modulated downlink data signal DDS. If the actual value of the modulated downlink data signal DDS falls below the average value $DDS_{AV}$, a demodulated output signal RX is output from the comparator 15, which represents the damped state of the antenna voltage at the voltage rail RF.

The sensitivity of the comparator 15 must be independent of the field strength or the distance between the transponder and a reader unit. However, the amplitude of the modulated downlink data signal DDS in fact varies with the field strength, which can be seen in the graph of amplitude of the limiter gate voltage (derived RF signal derived from the received RF signal) against time shown in FIG. 4. If the RFID transponder is close to the read/write unit, the field strength is high, the amplitude variation is large and the amount of noise compared to the amplitude of the signal is small. In this case a reduced sensitivity is required. On the other hand, if the transponder is further away from the read/write unit, the amplitude of the signal is small and the noise is then large compared to the maximum amplitude. This means that a field strength dependent correction is needed. The field strength dependent correction is provided using the field strength signal component FSS of the received RF signal. Low pass filter 4 filters out the field strength signal component FSS from the derived RF signal DRF so that it delivers only the field strength dependent DC offset from the derived RF signal DRF (the gate voltage of the transistor MN0 in the limiter circuit 1). By filtering out the modulated downlink data signal DDS and the carrier frequency part of the received RF signal, only the field strength information is maintained. The operational transconductance amplifier 5, which is an optional feature, transfers the field strength signal component FSS output from the low pass filter 4 into a field strength dependent current, which is then used for sensitivity correction of the comparator 15. The comparator 15 implements a hysteresis depending on the output of the OTA 5 via the signal sensitivity control provided by the field strength signal component FSS. The hysteresis window is enlarged if the DC offset of the limiter voltage is high or vice versa. At high field strength, the actual value at the band pass filter 3 has a high amplitude. The conversion into the digital demodulated signal RX output by the comparator 15 is done in this example with a reduced sensitivity (enlarged hysteresis window), which compensates for the higher amplitude of the actual value. At low field strength, the derived RF signal DRF has a low DC offset and a low amplitude of the modulated downlink data signal DDS. The sensitivity of the comparator can be increased by reducing the hysteresis window. Control of the comparator sensitivity is then performed in a feed forward manner. Therefore, a stable demodulator sensitivity is provided independent of the field strength. The sensitivity control signal used to control the comparator 15 is derived from the received RF signal. Therefore it is a receive strength indication, which can also be used for other purposes, for example charge pump enabling.

Although the present invention has been described hereinabove with reference to a specific embodiment, it is not limited to this embodiment, and no doubt further alternatives will occur to the skilled person that lie within the scope of the invention as claimed.

The invention claimed is:

1. In a RFID transponder having an antenna for receiving an RF signal including an amplitude modulated downlink data signal, a demodulating stage coupled to the antenna for receiving a derived RF signal which is an amplitude limited received RF signal, comprising:
   a first filter for extracting a field strength signal component from the derived RF signal; and
   a second filter for extracting a modulated downlink data signal component from the derived RF signal.

2. The RFID transponder according to claim 1 further comprising a comparator, and a demodulation sensitivity parameter being an input-related signal strength hysteresis of the comparator.

3. An RFID transponder having an antenna for receiving an RF signal including an amplitude modulated downlink data signal, and a demodulating stage coupled to the antenna for receiving a derived RF signal which is an amplitude limited received RF signal, the demodulating stage comprising:
   a first filter for extracting a field strength signal component from the derived RF signal;
   a second filter for extracting an amplitude modulated downlink data signal component from the derived RF signal; and
   a demodulator coupled to the second filter to receive the amplitude modulated downlink signal for demodulating the amplitude modulated downlink data signal component and coupled to the first filter to receive the field strength signal component such that the demodulator is adapted to vary a demodulation sensitivity parameter in response to the field strength signal component, wherein a limiter is coupled between the antenna and the demodulating stage, the limiter being adapted to act fast enough to suppress amplitude variations in received RF signal voltage due to the modulated downlink data signal included in the received RF signal in an internal supply voltage at an output of the limiter, and wherein the first filter and the second filter are coupled to the limiter for each receiving, as the derived RF signal, an internal control signal of the limiter, which reflects the amplitude variations that are to be suppressed by the limiter.

4. The RFID transponder according to claim 3, wherein the limiter comprises an NMOS transistor coupled between the antenna and ground level, a gate potential of which is controlled so as to limit the output voltage of the limiter, and wherein the input of the first filter and the input of the second filter are coupled to a gate of the NMOS transistor.

5. The RFID transponder according to claim 3, wherein the demodulator comprises a comparator, and the demodulation sensitivity parameter is an input-related signal strength hysteresis of the comparator.

6. The RFID transponder according to claim 4 wherein the demodulator comprises a comparator, and the demodulation sensitivity parameter is an input-related signal strength hysteresis of the comparator.

7. A method of controlling a demodulator of an RFID transponder, the method comprising:
    receiving an RF signal, which includes an amplitude modulated downlink data signal, with an antenna of the transponder;
    amplitude limiting the received RF signal to generate a derived RF signal, which is indicative of amplitude variations of the received RF signal;
    splitting the derived RF signal into a first signal component indicative of the field strength of the RF signal, and a second signal component indicative of the amplitude modulated downlink data signal;
    and demodulating the second signal component with a demodulator, the demodulation sensitivity of which is controlled by use of the first signal component.

8. The method according to claim 7, further comprising using the received RF signal for supplying the RFID transponder with an internal supply voltage, and limiting a magnitude of the received RF signal so as to limit the internal supply voltage, wherein the limiting step provides that the amplitude modulation of the amplitude modulated downlink data signal is suppressed in the internal supply voltage and a control signal generated during the limiting step is used as the derived RF signal.

\* \* \* \* \*